United States Patent [19]

Moser et al.

[11] Patent Number: 5,517,744
[45] Date of Patent: May 21, 1996

[54] PRESS-FIT TUBE-CONNECTION SYSTEM

[75] Inventors: Greg Moser; Jerry R. Smith, both of Columbus, Ind.

[73] Assignee: Cosco, Inc., Columbus, Ind.

[21] Appl. No.: 334,242

[22] Filed: Nov. 4, 1994

[51] Int. Cl.$^6$ ........................................................ B23P 19/02
[52] U.S. Cl. ................................ 29/525; 83/30; 5/93.1; 5/282.1; 5/286; 403/244; 403/283
[58] Field of Search ........................... 29/525, 897.32, 29/897.312; 5/93.1, 286, 282.1; 403/231, 244, 283, 274; 83/30, 54

[56] References Cited

U.S. PATENT DOCUMENTS

| | | |
|---|---|---|
| 583,385 | 5/1897 | Mayers . |
| 1,425,718 | 8/1922 | Sussman ................................ 5/282.1 |
| 3,058,777 | 10/1962 | Froedge . |
| 3,068,029 | 12/1962 | Schwartz ................................ 403/274 |
| 3,269,743 | 8/1966 | Barreca . |
| 3,747,450 | 7/1973 | Hudson ................................... 83/30 |
| 3,762,263 | 10/1973 | Bocceda ................................. 83/30 |
| 3,900,907 | 8/1975 | Mulder ................................... 5/93.1 |
| 4,302,874 | 12/1981 | Colas . |
| 4,627,146 | 12/1986 | Ward . |
| 4,741,081 | 5/1988 | Redman ................................. 29/525 |
| 4,769,897 | 9/1988 | Moseman . |
| 4,993,735 | 2/1991 | Chen et al. . |
| 5,090,837 | 2/1992 | Mower . |
| 5,134,732 | 8/1992 | Li . |

FOREIGN PATENT DOCUMENTS

| | | | |
|---|---|---|---|
| 2404753 | 6/1979 | France ................................. 403/283 |
| 926998 | 3/1955 | Germany ............................ 403/244 |
| 128922 | 8/1950 | Sweden ............................... 5/282.1 |

*Primary Examiner*—David P. Bryant
*Attorney, Agent, or Firm*—Barnes & Thornburg

[57] ABSTRACT

A method is provided for connecting a spindle to a tube. The method includes the step of punching a hole in an exterior wall of a tube to create a perimeter edge bordering the tube. The perimeter has a first pre-determined shape. The method further includes the step of press-fitting an end portion of a spindle having a second pre-determined shape different than the first pre-determined shape into the hole to establish a tight fit between the spindle and the tube retaining the spindle in coupled relation in the tube.

34 Claims, 3 Drawing Sheets

PRESS-FIT TUBE-CONNECTION SYSTEM

BACKGROUND AND SUMMARY OF THE INVENTION

The present invention relates to tube-connection systems, and particularly to a process of connecting a spindle or the like to a tube. More particularly, the present invention relates to a press-fit tube-connection system.

Many conventional pieces of furniture are constructed of metal tubes that are joined together to yield a sturdy unit. For example, it is known to produce juvenile products such as cribs, cradles, toddler beds, high chairs, and dressing tables by welding steel tubes together to form the various side panels, end panels, frames, legs, etc. included in those products. Of course, many types of furniture other than juvenile products include welded metal tubular components.

What is needed is an improved process for manufacturing sturdy pieces of furniture which include tubular components so that it is not necessary to weld such tubular components to one another to anchor tubular components to one another during assembly. Such a process would be welcomed by manufacturers of juvenile furniture desirous of minimizing manufacturing costs and enhancing furniture quality and appearance.

According to the present invention, a method is provided of connecting a spindle to a tube. The method includes the steps of punching a non-round hole in an exterior wall of the tube and press-fitting an end portion of the spindle into the non-round hole to establish a tight fit between the spindle and the tube. The fit is tight enough so as to retain the spindle in coupled relation to the tube.

In preferred embodiments of the present invention, the punching step is completed using a scissors punch including a shank for mounting in a punch press and two sharpened downwardly projecting tube-piercing tips. The tube is placed in a support fixture and the scissors punch is moved to engage the tube so that the tube-piercing tips puncture an exterior wall of the tube and other edges on the downwardly projecting end of the scissors punch slice through other portions of the exterior wall to form the non-round hole therein. Next, the scissors punch is withdrawn from engagement with the tube and a spindle is inserted into the non-round hole and moved therein to establish a tight fit between the spindle and the punctured tube. By sizing the punch to produce a properly sized hole for a given spindle, it is thus possible to connect a spindle to a tube using the method of the present invention without welding the spindle to the tube.

The spindle-receiving hole formed in the tube using a method in accordance with the present invention is not round and the term "non-round" is used herein to characterize a hole that is not circular or round. Illustratively, a suitable non-round hole could appear to have a somewhat oblong shape. The perimeter border of a suitable non-round hole formed in accordance with the method of the present invention could also be defined by an irregularly shaped or undulating edge in the tube that is created during the punching step. Illustratively, the outer diameter of the spindle is greater than the nominal inner diameter of the non-round spindle-receiving hole formed in the tube.

Illustratively, the spindle, once press-fit into a non-round hole formed in a tube, does not "bottom out" on an inner wall of the tube opposite to the spindle-receiving non-round hole, but rather the spindle extends a distance into the hollow tube that is about one-half of the inner diameter of the tube so as to prevent removal of the press-fit spindle from the non-round hole formed in the tube. Frictional engagement of the spindle and the tube prevents the spindle from backing out of the non-round hole formed in the tube. Advantageously, it is not necessary to weld the spindle to the tube at the junction therebetween to couple the spindle securely to the tube once the two elements have been coupled together using the method of the present invention.

It is within the scope of the present invention to press-fit various members into holes formed in tubes. Within this application, "spindle" is used to refer to various spindles, rods, tubes, or other generally elongated members of the type used in the construction of furniture.

Ideally, the method of the present invention is used to couple metal tubular spindles to metal tubes to produce subassemblies used in the construction of furniture for use by juveniles. Illustratively, such a method could be used to produce side panels and end panels of cribs, cradles, and beds. In addition, the method could be used to manufacture portions of high chairs, swings, dressing and changing tables, and other juvenile products. Of course, it will be understood that the method is not limited for use only in connection with the manufacture of juvenile products, but could be used to make a wide range of furniture items constructed using tubular elements.

It is within the scope of the invention to punch many holes in one tube simultaneously and then press-fit one spindle into each of the holes punched in the tube so that a series of spindles are aligned in perpendicular relation to the tube and coupled in fixed relation to the tube. Such a method is well-suited for use in manufacturing side panels or end panels in metal tubular cribs, cradles, and the like.

Additional objects, features, and advantages will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 9:
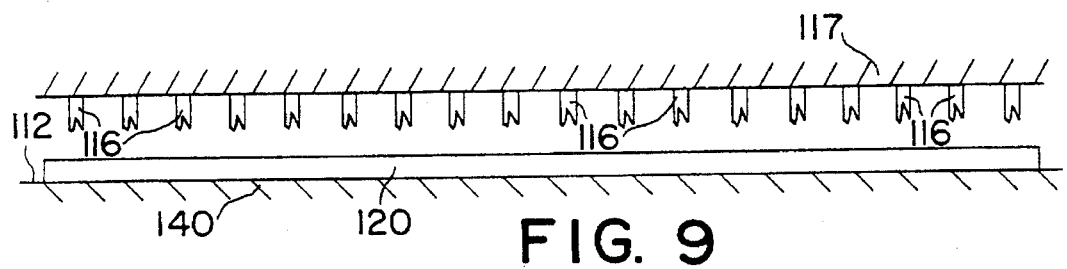
FIG. 9 is a side elevation view of a tube supported along its length in a fixture and an overlying punch assembly carrying a plurality of scissors punches for simultaneously forming a series of non-round holes in the underlying tube.
Figure 10:
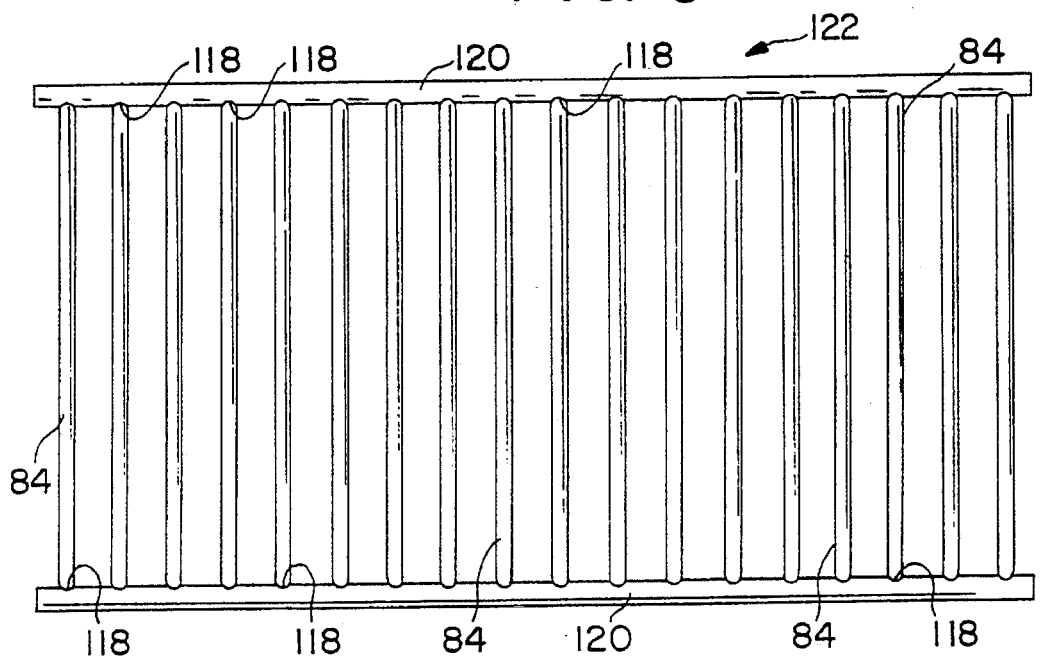
FIG. 10 is a side elevation view of one side panel of a crib constructed using a method in accordance with the present invention and the assembly shown in FIG. 9.
Figure 11:
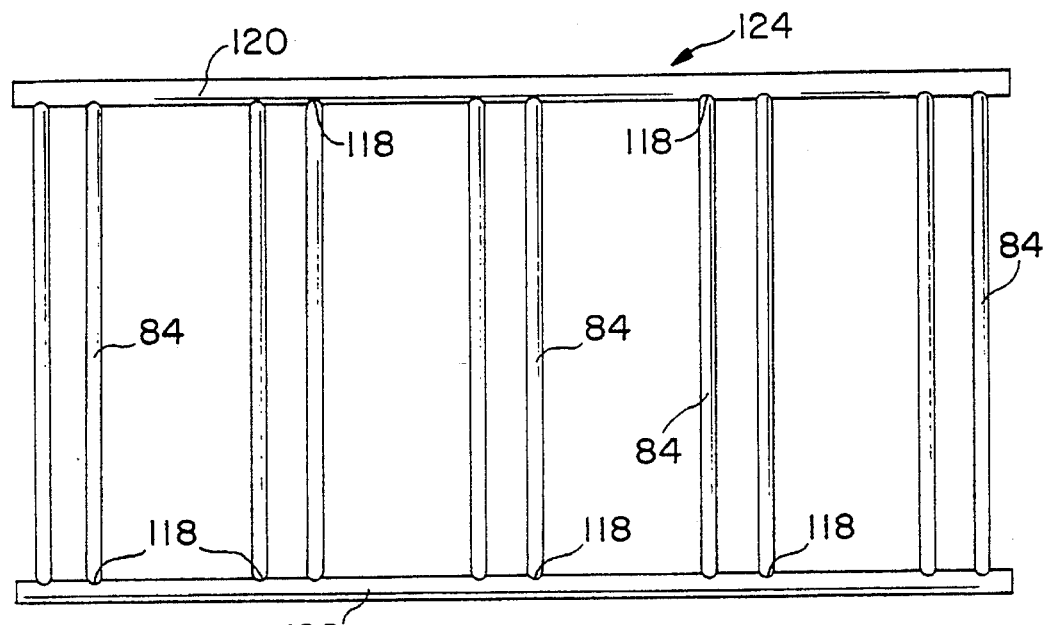
FIG. 11 is a side elevation view of another side panel of a crib constructed using a method in accordance with the present invention.

A method of coupling a spindle or the like to a tube without establishing a welded connection between the spindle and the tube is shown in FIGS. 1–8. Various applications of this method for use in constructing juvenile furniture are shown in FIGS. 9–11. Illustratively, such a method is used to establish a friction fit between the spindle and the tube so as to retain the spindle in coupled relation to the tube.

Figure 1:
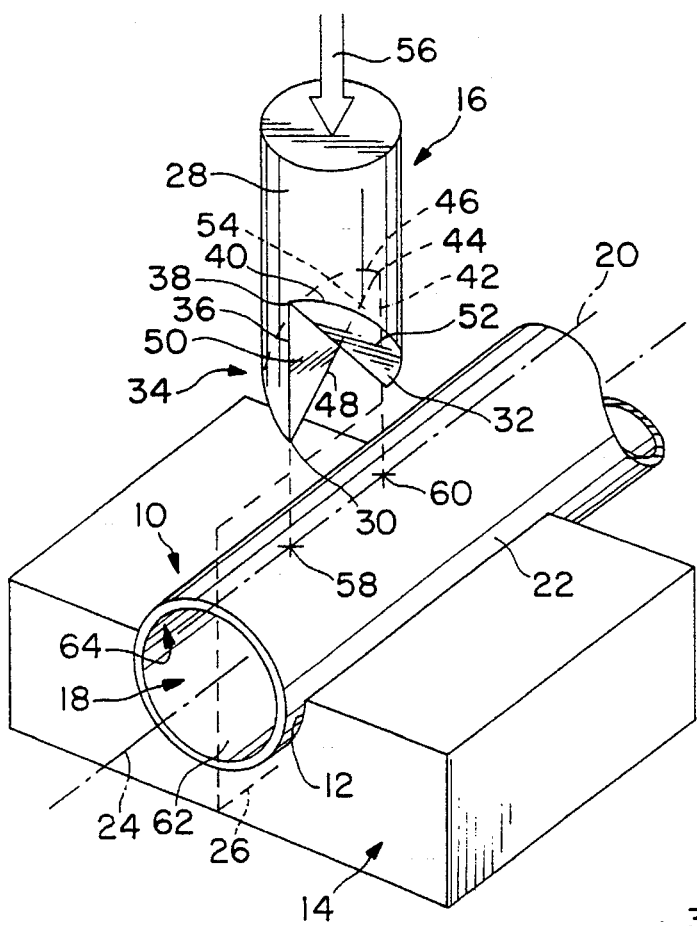
FIG. 1 is a perspective view of a scissors punch as it is being lowered toward a tube supported in a fixture prior to engagement of two tube-piercing tips on the scissors punch and an exterior wall of the tube.

Referring to FIG. 1, a tube 10 is placed in a channel 12 formed in a support fixture 14 and arranged to lie underneath a punch 16 mounted in a punch press (not shown). The tube 10 is illustratively a thin-walled steel tube formed to include a longitudinally extending hollow interior region 18. As shown in FIG. 1, a longitudinally extending "alignment line" 20 is delineated on an upwardly facing portion of a cylindrical exterior wall 22 of the tube 10. This alignment line 20 lies in spaced-apart parallel relation to a central axis 24 of tube 10 and lies in a vertical plane 26 passing through central axis 24.

Punch 16 is preferably a "scissors punch" having a shank 28 for mounting in a punch press (not shown) and two downwardly projecting tube-piercing tips 30, 32 as shown best in FIG. 1. A lower portion 34 of punch 16 includes an outer edge that is configured to slice through exterior wall 22 of tube 10 following puncture of exterior wall 22 by tube-piercing tips 30, 32 and during punching engagement of tube 10 and punch 16 as shown, for example, in FIG. 3. It is within the scope of the invention to use a punch having two or more tube-piercing tips (i.e., "flutes"). It is also within the scope of the invention to use a punch to produce a non-round spindle-receiving hole in a tube.

Figure 2:
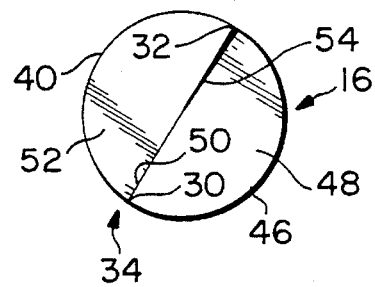
FIG. 2 is a bottom view of the scissors punch shown in FIG. 1.
Figure 3:
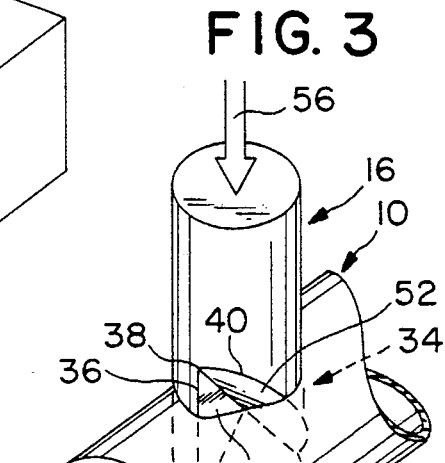
FIG. 3 is a view of the tube and punch of FIG. 1 following movement of the punch through a portion of the exterior wall of the tube and showing the two tube-piercing tips of the punch in phantom.

As shown in FIGS. 1 and 2, lower portion 34 of punch 16 includes a first straight section 36 having a first end at the first tube-piercing tip 30 and an opposite second end 38. Lower portion 34 further includes a first curved section 40 interconnecting the second end 38 of the first straight section 36 and the second tube-piercing tip 32. Also included in lower portion 34, and shown in phantom in FIG. 1, is a second straight section 42 having a first end at the second tube-piercing tip 32 and an opposite second end 44. Also, a second curved section 46 interconnecting the second end 44 of the second straight section 42 and the first tube-piercing tip 30 is included in lower portion 34 and shown in phantom in FIG. 1.

Punch 16 is formed to include a first inclined bottom wall 48, a first vertical side wall 50, a second inclined bottom wall 52, and a second vertical side wall 54 as shown in FIGS. 1 and 2. It will be understood that straight sections 36, 42 and curved sections 40, 46 cooperate to define an outer edge of the lower portion 34 of punch 16 that functions to slice through exterior wall 22 of tube 10 during use of punch 16 to punch a non-round hole in exterior wall 22 of tube 10.

In use, punch 16 initially is moved downwardly in direction 56 toward tube 10 supported in fixture 14 as shown in FIG. 1. Preferably the punch 16 is oriented (i.e., rotated about its vertical axis) so that each of the first and second tube-piercing tips 30, 32 will intercept alignment line 20 on tube 10 at puncture points 58, 60 upon engagement of punch 16 and exterior wall 22 of tube 10. Once punch 16 is oriented properly, punch 16 is moved further in direction 56 (without providing any mandrel inside interior region 18 of tube 10) to cause lower portion 34 of punch 16 to pass through a portion of exterior wall 22 and into hollow interior region 18 as shown, for example, in FIG. 3. During such punching, exterior wall 22 is punctured first in two locations 58, 60 by tube-piercing tips 30, 32, and then sliced in two places by sections 36, 40 and sections 42, 46 defining an outer edge on lower portion 34 of punch 16. Illustratively, punch 16 is moved far enough into interior region 18 of tube 10 to produce a suitable hole in exterior wall 22 of tube 10 but not so far that tube-piercing tips 30, 32 engage a bottom portion 62 of an inner wall 64 defining interior region 18.

Figure 5:
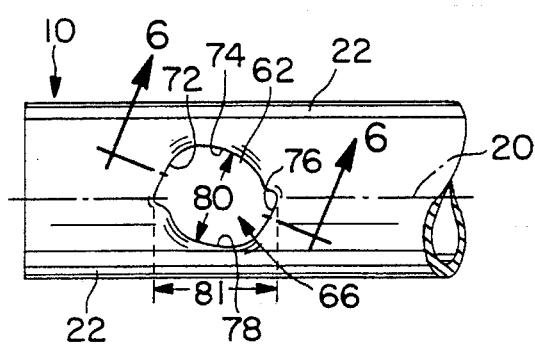
FIG. 5 is a plan view of the non-round hole formed in the tube and illustrated in FIG. 4.
Figure 4:
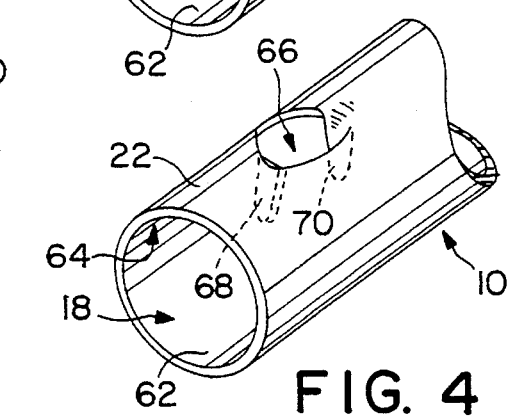
FIG. 4 is a view similar to FIG. 3 following removal of the punch from a non-round hole formed in the exterior wall of the tube and showing two tabs (in phantom) created by the use of the punch to puncture the tube.

Once punch 16 has been used to create a properly sized non-round hole 66 in exterior wall 22 of tube 10, it is moved upwardly in a direction opposite direction 56 to withdraw lower portion 34 of punch 16 from engagement with tube 10. As shown in FIG. 4, scissors punch 16 operated to slice and deflect certain portions of exterior wall 22 during the tube-punching step described above to produce a non-round hole 66 having a perimeter edge and first and second tabs 68, 70 appended to exterior wall 22 at the perimeter edge and arranged to extend downwardly into hollow interior region 18 and lie in spaced-apart relation one to another. Although a non-round hole having a shape of the type shown in FIG. 5 is preferred, a non-round hole having an irregularly shaped perimeter edge or undulating perimeter edge would be acceptable.

Figure 6:
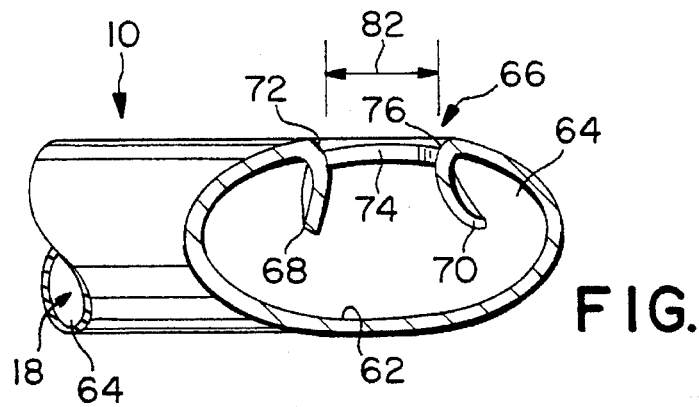
FIG. 6 is a diagonal sectional view of the tube taken along line 6—6 of FIG. 5 showing portions of the two spaced-apart tabs lying in a hollow interior region of the tube following use of the punch to create the non-round hole.

As shown best in FIG. 6, the perimeter edge defining non-round hole 66 includes in series a first end edge 72, a first side edge 74, a second end edge 76, and a second side edge 78. Illustratively, lower portion 34 of punch 16 is configured and contoured to cause first end edge 72 to have a curved shape and second end edge 76 to lie in spaced-apart relation thereto and have a shape that is an inverted (i.e., end-for-end) mirror image of the first end edge 72 as shown in FIG. 5. In addition, lower portion 34 of punch 16 is configured and contoured to cause first side edge 74 to have a serpentine shape and second side edge 78 to lie in spaced-apart relation thereto and have a shape that is an inverted (i.e., end-for-end) mirror image of the first side edge 74 as shown in FIG. 5. It is within the scope of the invention to vary the size and shape of the perimeter edge 72, 74, 76, 78 of non-round hole 66 somewhat to provide a suitable spindle-receiving receptacle for establishing press-fit engagement with a spindle received therein. As shown in FIG. 5, non-round hole 66 has a nominal inner diameter 80 (e.g., width dimension) defined between first and second side edges 74, 78 and a nominal diagonal dimension 81 defined between the junction of edges 72, 78 and the junction of edges 74, 76, and as shown in FIG. 6, non-round hole 66 has a length dimension 82 defined between first and second tabs 68, 70.

Figure 7:
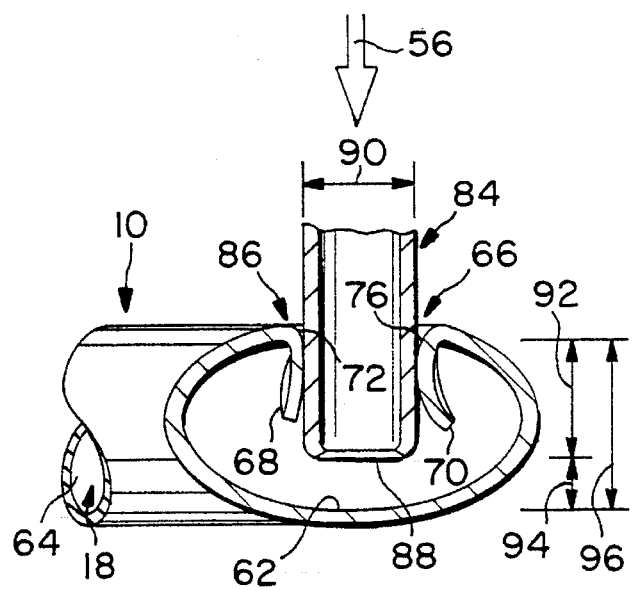
FIG. 7 is a view similar to FIG. 6 showing press-fitting of a spindle into the non-round hole formed in the tube.
Figure 8:
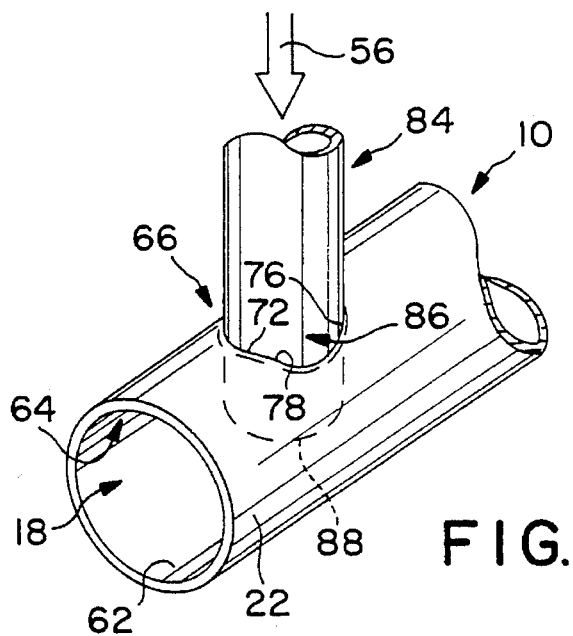
FIG. 8 is a view similar to FIG. 4 showing the spindle of FIG. 7 coupled to the tube of FIG. 7 using a press-fit tube-connection system in accordance with the present invention.

A spindle 84 is provided to be inserted into non-round hole 66 formed in tube 10 as shown in FIGS. 7 and 8. Spindle 84 is illustratively a thin-walled, cylindrical, tubular member made of steel. Spindle 84 includes an end portion 86 having a distal tip 88. Each spindle 84 illustratively has a tapered distal tip 88 similar to the type of taper produced on a pipe using a rotary pipe cutter. No secondary operation is needed to achieve this taper on distal tip 88. As mentioned earlier, a wide variety of metal and non-metal, hollow and solid core spindles, rods, tubes, and other elongated members could be press-fit into non-round hole 66 in tube 10 and fall within the scope of the present invention.

In practice, the distal tip 88 of spindle 84 is inserted into the open mouth of non-round hole 66 and the spindle 84 is urged in direction 56 with sufficient force to cause end portion 86 of spindle 84 to lodge against perimeter edge 72, 74, 76, 78 and tabs 68, 70 as shown in FIGS. 7 and 8. Illustratively, the outer diameter 90 of spindle 84 is greater than nominal inner diameter 80 (FIG. 5) and length dimension 82 (FIG. 6) of non-round hole 66 to establish a tight fit between spindle 84 and tube 10 of the type shown in FIGS. 7 and 8. For example, in a tube 10 having an outer diameter of 1.25 inches (3.18 cm), a scissors punch 16 having an outer diameter of 0.610 inch (1.55 cm) of the type shown in FIG. 1 can be used to produce a non-round hole 66 having a nominal inner diameter 80 of 0.610 inch (1.55 cm), a length dimension 82 of 0.610 inch (1.55 cm), and a diagonal dimension 81 of 0.688 inch (1.75 cm) for receiving and retaining a spindle 84 having an outer diameter of 0.625 inch (1.59 cm).

As shown in FIG. 7, end portion 86 of spindle 84 is inserted into non-round hole 66 and moved in direction 56 a distance 92 until distal tip 88 lies a distance 94 from bottom portion 62 of inner wall 64 of tube 10. Illustratively, distance 92 is greater than one-half of dimension 96 shown in FIG. 7. Preferably, tube 10 and spindle 84 are painted or otherwise finished after the spindle 84 is coupled to tube 10 in the manner shown in FIG. 8.

A punch apparatus 110 including a line of spaced-apart punches 116 mounted on mounting fixture 117 for punching a series of non-round holes 118 simultaneously in an underlying tube 120 is shown in FIG. 9. Tube 120 is supported in a tube-receiving channel 112 formed in support fixture 140. Punches 116 are similar in shape and configuration to punch 16 shown in FIGS. 1–3. Punch apparatus 110 is used to form a series of uniformly spaced-apart non-round holes 118 in tubes 120 for receiving spindles 84 as shown in FIG. 10 to produce a side panel 122 for us in a crib (not shown). By changing the placement of punches 116 on mounting fixture 117, it would be possible to produce a side panel 124 of the type shown in FIG. 11.

Although the invention has been described in detail with reference to preferred embodiments, variations and modifications exist within the scope and spirit of the invention as described and defined in the following claims.

We claim:
1. A method of connecting a spindle to a tube, the method comprising the steps of punching a non-round hole in an exterior wall of a tube to create a perimeter edge bordering the non-round hole having in series a first end edge, a first side edge, a second end edge, and a second side edge connecting to the first end edge, the first and second end edges being about equal in length, the first and second side edges being about equal in length, and press-fitting a round end portion of a spindle into the non-round hole to establish a tight fit between the round end portion of the spindle and the tube for retaining the spindle in coupled relation to the tube.

2. The method of claim 1, wherein the punching step includes the steps of providing a scissors punch having spaced-apart first and second tube-piercing tips and outer edges and engaging the first and second tube-piercing tips and the outer edges of the scissors punch with the exterior wall of the tube to produce the non-round hole in the exterior wall of the tube.

3. The method of claim 2, wherein the punching step further includes the step of withdrawing the scissors punch from engagement with the tube after the engaging step and before the press-fitting step.

4. The method of claim 2, wherein the outer edges of the scissors punch include a first straight section having a first end at the first tube-piercing tip and an opposite second end, a first curved section interconnecting the second end of the first straight section and the second tube-piercing tip, a second straight section having a first end at the second tube-piercing tip and an opposite second end, and a second curved section interconnecting the second end of the second straight section and the first tube-piercing tip.

5. The method of claim 1, wherein the punching step includes the steps of engaging a punch and the exterior wall of the tube and moving the punch against the tube to pierce the exterior wall of the tube and move a portion of the exterior wall of the tube into a hollow interior region in the tube so as to form the non-round hole.

6. The method of claim 5, wherein the press-fitting step includes the steps of inserting one end of the spindle into the hollow interior region of the tube through the non-round hole and urging the one end of the spindle into engagement with the portion of the exterior wall.

7. The method of claim 5, wherein the moving step includes the steps of separating said portion of the exterior wall into a first tab and a separate second tab and pushing a distal end of each tab into the hollow interior region of the tube.

8. The method of claim 7, wherein the first tab is appended to the first end edge and the second tab is appended to the second end edge and positioned to lie in spaced-apart relation to the first tab.

9. The method of claim 1, wherein the punching step is completed using a punch having a curved exterior wall to establish a curved shape for each of the first and second end edges during the punching step.

10. The method of claim 9, wherein the first and second end edges are arranged to lie in spaced-apart confronting relation to one another following the punching step so that the second end edge is an inverted mirror image of the first end edge.

11. The method of claim 1, wherein the punching step is completed using a punch having a curved exterior wall formed to include at least two openings therein to establish a serpentine shape for each of the first and second side edges during the punching step.

12. The method of claim 11, wherein the first and second side edges are arranged to lie in spaced-apart confronting relation to one another following the punching step so that the second side edge is an inverted mirror image of the first side edge.

13. A method of connecting spindle to a tube the method comprising the steps of punching a non-round hole in an exterior wall of a tube to create a perimeter edge bordering the non-round hole having in series a first end edge, a first side edge, a second end edge, second side edge connecting to the first end edge, the first and second end edges being about equal in length, the first and second side edges being about equal in length, and press-fitting an end portion of a spindle into the non-round hole to establish a tight fit between the spindle and the tube retaining the spindle in coupled relation to the tube, the tube including a hollow interior region extending therethrough, the punching step including the steps of supporting the tube in a fixture and using a scissors punch to create the non-round hole in the exterior wall of the tube without inserting a mandrel into the hollow interior region in the tube during engagement of the scissors punch and the tube.

14. A method of connecting a spindle to a tube, the tube having a longitudinal axis extending therethrough, the method comprising the steps of punching a non-round hole in an exterior wall of a tube to create a perimeter edge bordering the non-round hole having in series a first end edge, a first side edge, a second end edge, and a second side edge connecting to the first end edge, the first and second end edges being about equal in length, the first and second side edges being about equal in length, and press-fitting an end portion of a spindle into the non-round hole to establish a tight fit between the spindle and the tube retaining the spindle in coupled relation to the tube, the punching step including the steps of providing a scissors punch having spaced-apart first and second tube-piercing tips, orienting the scissors punch relative to the tube so that the first and second tube-piercing tips intersect a longitudinally extending alignment line lying on the exterior surface of the tube and in spaced-apart parallel relation to the longitudinal axis of the tube, and moving the scissors punch into engagement with the tube to establish in sequence initially two puncture holes in the exterior wall of the tube on said alignment line and then the non-round hole in the exterior wall of the tube.

15. The method of claim 14, further comprising the step of using the scissors punch during the moving step to form a first tab appended to the first end edge and arranged to extend into a hollow interior region of the tube and a second tab appended to the second end edge and arranged to extend into the hollow interior region of the tube and lie in spaced-apart relation to the first tab.

16. The method of claim 15, wherein the press-fitting step includes the steps of inserting the end portion of the spindle into the hollow interior region in the tube through the non-round hole and urging the end portion of the spindle into engagement with the first and second tabs.

17. The method of claim 16, wherein the end portion has a distal tip, the tube has an inner wall defining the hollow interior region of the tube, the inner wall has a bottom portion lying in spaced-apart confronting relation to the non-round hole and between distal ends of the first and second tabs, and the distal tip is moved to assume a mounted position in the hollow interior region of the tube lying in spaced-apart relation to the bottom portion of the inner wall during the urging step.

18. A method of connecting a spindle having round end portion to a tube, the method comprising the steps of punching an exterior wall of a tube having a hollow interior region to form a hole in the exterior wall of the tube and form first and second tabs appended to the exterior wall of the tube and arranged to lie in spaced-apart relation to one another in the hollow interior region of the tube, and press-fitting the round distal end of the spindle into the hole and in engagement with the tabs to establish a tight fit between the spindle and the tube retaining the spindle in coupled relation to the tube.

19. The method of claim 18, wherein the punching step includes the steps of engaging a punch and the exterior wall of the tube and moving the punch against the tube to pierce the exterior wall of the tube and move a portion of the exterior wall of the tube into a hollow interior region formed in the tube so as to form the hole and the first and second tabs.

20. The method of claim 19, wherein the press-fitting step includes the steps of inserting one end of the spindle into the hollow interior region of the tube through the hole and urging the one end of the spindle into engagement with the portion of the exterior wall.

21. The method of claim 19, wherein the moving step includes the steps of separating said portion of the exterior wall into a first tab and a separate second tab and pushing a distal end of each tab into the hollow interior region of the tube.

22. The method of claim 18, wherein the spindle has a distal tip, the tube has an inner wall defining the hollow interior region of the tube, the inner wall has a bottom portion lying in spaced-apart confronting relation to the hole and between distal ends of the first and second tabs, and the distal tip is moved to assume a mounted position in the hollow interior region of the tube lying in spaced-apart relation to the bottom portion of the inner wall during the press-fitting step.

23. A method of connecting a spindle to a tube, the method comprising the steps of punching an exterior wall of a tube having a hollow interior region to form a hole in the exterior wall of the tube and form first and second tabs appended to the exterior wall of the tube and arranged to lie in spaced-apart relation to one another in the hollow interior region of the tube, and press-fitting a distal end of a spindle into the hole and in engagement with the tabs to establish a tight fit between the spindle and the tube retaining the spindle in coupled relation to the tube, the tube having a longitudinal axis extending therethrough, the punching step including the steps of providing a scissors punch having spaced-apart first and second tube-piercing tips, orienting the scissors punch relative to the tube so that the first and second tube-piercing tips intersect a longitudinally extending alignment line lying on the exterior surface of the tube and in spaced-apart parallel relation to the longitudinal axis of the tube, and moving the scissors punch into engagement with the tube to establish in sequence two puncture holes in the exterior wall of the tube on said alignment line and the hole in the exterior wall of the tube.

24. A method of connecting a spindle to a tube, the method comprising the steps of punching an exterior wall of a tube having a hollow interior region to form a hole in the exterior wall of the tube and form first and second tabs appended to the exterior wall of the tube and arranged to lie in spaced-apart relation to one another in the hollow interior region of the tube, and press-fitting a distal end of a spindle into the hole and in engagement with the tabs to establish a tight fit between the spindle and the tube retaining the spindle in coupled relation to the tube, the tube including a hollow interior region extending therethrough, the punching step including the steps of supporting the tube in a fixture and using a scissors punch to create the hole in the exterior wall of the tube without inserting a mandrel into the hollow interior region in the tube during engagement of the scissors punch and the tube.

25. A method of connecting a spindle having a round end portion to a tube, the method comprising the steps of punching a non-round hole in a tube, and press-fitting the round distal end of the spindle into the non-round hole to establish a tight fit between the spindle and the tube retaining the spindle in coupled relation to the tube.

26. The method of claim 25, wherein the distal end has a cylindrical transverse cross-sectional shape positioned to wedge in the non-round hole formed in the tube during the press-fitting step.

27. The method of claim 25, wherein the tube includes an undulating edge formed during the punching step defining a perimeter edge of the non-round hole.

28. A method for connecting a spindle to a tube, the method comprising the steps of punching a hole in an exterior wall of a tube to create a perimeter edge bordering the tube, the perimeter having a first pre-determined shape, and press-fitting an end portion of a spindle having a second pre-determined shape different than the first pre-determined shape into the hole to establish a tight fit between the spindle and the tube retaining the spindle in coupled relation in the tube.

29. The method of claim 28, wherein the punching step includes the steps of providing a punch having spaced-apart first and second tube-piercing tips and outer edges and engaging the first and second tube-piercing tips and the outer edges of the punch with the exterior wall of the tube to produce the hole in the exterior wall of the tube.

30. The method of claim 29, wherein the punching step further includes the step of withdrawing the punch from engagement with the tube after the engaging step and before the press-fitting step.

31. The method of claim 28, wherein the tube includes a hollow interior region extending therethrough and the punching step includes the steps of supporting the tube in a fixture and using a scissors punch to create the hole in the exterior wall of the tube without inserting a mandrel into the hollow interior region in the tube during engagement of the scissors punch and the tube.

32. The method of claim 28, wherein the punching step includes the steps of engaging a punch and the exterior wall of the tube and moving the punch against the tube to pierce the exterior wall of the tube and move a portion of the exterior wall of the tube into a hollow interior region formed in the tube so as to form the hole in the exterior wall of the tube.

33. The method of claim 32, wherein the press-fitting step includes the steps of inserting one end of the spindle into the hollow interior region of the tube through the hole in the exterior wall of the tube and urging the one end of the spindle into engagement with the portion of the exterior wall.

34. The method of claim 32, wherein the moving step includes the steps of separating said portion of the exterior wall into a first tab and a separate second tab and pushing a distal end of each tab into the hollow interior region of the tube.

* * * * *